United States Patent
Brandt, Jr.

(10) Patent No.: US 10,119,853 B2
(45) Date of Patent: Nov. 6, 2018

(54) DECOUPLING POINT WEIGHT MEASUREMENT

(71) Applicant: Robert O Brandt, Jr., Wilmington, NC (US)

(72) Inventor: Robert O Brandt, Jr., Wilmington, NC (US)

( * ) Notice: Subject to any disclaimer, the term of this patent is extended or adjusted under 35 U.S.C. 154(b) by 116 days.

(21) Appl. No.: 15/098,886

(22) Filed: Apr. 14, 2016

(65) Prior Publication Data

US 2017/0299422 A1    Oct. 19, 2017

(51) Int. Cl.
*G01G 13/24*    (2006.01)

(52) U.S. Cl.
CPC ................... *G01G 13/248* (2013.01)

(58) Field of Classification Search
CPC ...... G01G 13/247; G01G 13/248; G01F 1/00; G01F 1/10; G01F 1/42; G01F 1/46; G01F 1/56; G01F 1/66; G01F 15/00
See application file for complete search history.

(56) References Cited

U.S. PATENT DOCUMENTS

| | | | |
|---|---|---|---|
| 3,110,419 A | 11/1963 | Atkins et al. | |
| 3,164,217 A | 1/1965 | Peirce et al. | |
| 3,822,866 A * | 7/1974 | Daester | B01F 15/0445 366/8 |
| 4,762,252 A * | 8/1988 | Hyer | G01G 13/248 177/121 |
| 4,766,966 A * | 8/1988 | Nagao | G01G 13/06 177/123 |
| 4,775,949 A * | 10/1988 | Kalata | G01G 11/08 177/59 |
| 4,880,142 A * | 11/1989 | Higuchi | G01G 11/086 177/114 |
| 4,893,262 A * | 1/1990 | Kalata | G01G 11/08 177/59 |
| 4,944,428 A | 7/1990 | Gmur et al. | |
| 5,024,352 A | 6/1991 | Gmur et al. | |
| 5,081,600 A * | 1/1992 | Tump | G05D 7/0611 177/105 |
| 5,132,897 A * | 7/1992 | Allenberg | G01G 11/086 177/59 |
| 5,184,754 A | 2/1993 | Hansen | |
| 5,260,880 A * | 11/1993 | Tump | G05D 7/0611 177/105 |

(Continued)

*Primary Examiner* — Natalie Huls
(74) *Attorney, Agent, or Firm* — Daniel Becker; Robert G. Rosenthal

(57) ABSTRACT

An apparatus or method for weighing and/or measuring the flow rate of quantity of a particulate flowing out of a hopper wherein the hopper is isolated from the other components of the apparatus. The apparatus and method are adapted to generate a decoupling point boundary that demarcates the total amount of particulate in the hopper into portions that are not fully supported and portions that are fully supported by the hopper. The particulate is in continuous contact with itself from the inlet to the outlet, with the particulate contained between the isolated hopper and the rest of the components of the system by a flexible coupling or some other method of containment. The invention has the advantages of higher accuracy, decreased cost and complexity, and greater reliability than other solid particulate weighing systems of the prior art, particularly when dealing with low density particulates.

1 Claim, 7 Drawing Sheets

(56) References Cited

U.S. PATENT DOCUMENTS

| | | | | |
|---|---|---|---|---|
| 5,261,743 A * | 11/1993 | Moller | ............... | B29B 7/728 |
| | | | | 177/121 |
| 5,341,307 A * | 8/1994 | Myhre | ............ | G05D 7/0605 |
| | | | | 177/105 |
| 5,423,455 A * | 6/1995 | Ricciardi | ......... | G01G 11/086 |
| | | | | 141/1 |
| 5,466,894 A | 11/1995 | Naef | | |
| 5,831,855 A | 11/1998 | Kinsman | | |
| 6,168,305 B1 * | 1/2001 | Marmsater | ........ | G01G 11/086 |
| | | | | 177/25.13 |
| 6,675,073 B2 * | 1/2004 | Kieman | ........... | G05B 13/024 |
| | | | | 700/240 |
| 7,222,750 B2 | 5/2007 | Mosca | | |
| 7,534,970 B2 * | 5/2009 | Tump | ............... | G01G 11/086 |
| | | | | 177/116 |
| 8,200,367 B2 * | 6/2012 | Foley | .............. | G01G 13/003 |
| | | | | 700/240 |
| 2009/0294469 A1 * | 12/2009 | Poulain | ............ | G01G 13/00 |
| | | | | 222/1 |
| 2012/0181093 A1 * | 7/2012 | Fehr | ................ | G01G 11/086 |
| | | | | 177/103 |

\* cited by examiner

DECOUPLING POINT WEIGHT MEASUREMENT

FIELD OF THE INVENTION

This invention relates generally to the field of measurement of particulate materials, and more specifically, to a method and apparatus that works particularly well when weighing a volume of a low density particulate in a hopper which data can be used in combination with a feed system to determine flow rates and hopper refill times.

BACKGROUND OF THE INVENTION

Solid particulate products, such as grain, animal feed (barley, corn, wheat, and animal by-products), cereals, cat litter, and other particulate materials are normally converted from bulk material into smaller portions for sale. As part of the packaging process, a bulk quantity of product is placed into a hopper. At the exit end of the hopper is a valve that controls the rate that the product flows out of the hopper. To accurately and efficiently fill units of such products, manufacturing technologies have attempted to allow for continuous monitoring of said products.

A number of methods of measuring a run of continuously flowing solid particulate are currently in use: weighing the entire mechanism, measuring the height of the product, inferring hopper level, based on fill weight, and measuring a batch amount. The first method, of determining product weight is to weigh the entire mechanism, which includes the hopper, the feed mechanism and all of the supporting structure. The first steps are to weigh the empty mechanism without the product, and then to re-weigh the mechanism when filled with the product, the difference being the product weight. The drawbacks of this system reside in the fact that often the weight of the mechanism (hopper, feed mechanism and supporting structure) is many times the weight of the product. In order to ensure accurate measurement, such systems require a very high resolution in order to measure the proportionally very small changes of the overall system, in order to ascertain an accurate measurement of the product weight, whose proportions may be fluctuating greatly with respect to only its own magnitude. This is particularly an issue when low density products such as low density polystyrene balls must be measured.

The second method, measuring the height of the product, employs a level detector to measure the height of a volume of product in a shaped vessel or a hopper. This method is unreliable in the context of certain materials, particularly ones that may be susceptible to clumping, or which may become scattered or which become airborne in significant enough volume, before settling-out. Thus it will be seen that the volume of a particulate material can be difficult to be detect, especially when a low density product is present. Because it does not continuously sit as a settled volume, a low density product has a level detected that a sensor can only recognize for the amount which has fallen out of the air, and therefore may not fully account for the entire amount moving through the system.

The third method, determining hopper level or fill by inferring hopper level based on fill weight, is also flawed. Measurement of weight is normally considered a good method of determining hopper level, since bulk density of a given material usually fairly consistent, and it "integrates" the uneven surface level of the product and does not rely on material characteristics. Notwithstanding the foregoing, level by weight is still considered the most accurate method of solid particle level measurement, albeit the most expensive. Hopper level may also be measured directly by employing a level sensor positioned above the hopper, but this method can be unreliable due to product shape. In addition, the surface characteristics of some materials make it difficult to reliably sense the location of the surface.

The last prior art method measures a batch amount of product delivered to the hopper, in order to make the estimate of the overall system flow rate. Whether by weight or by volume, for a given batch amount, the product of the batch and the time which is required to deliver a batch amount yields the flow rate. A change in weight with respect to time is the flow rate, or in other words, the first derivative of the weight with respect to time yields the flow rate. There are currently two measurement methods or techniques in general use—supported and suspended. Like the first of the discussed prior art methods, ascertaining the loss-in-weight of an entire system, the entire weight of the mechanism (the hopper, vibratory tray and the electromagnetic drive) plus the weight of the product is measured. As a result, even though the analysis focuses upon a different criteria, the apparatus for performing such methods still requires the high resolution weighing systems that bring the disadvantages of unreliability, complexity, inaccuracy, and increased cost.

In view of the foregoing, it is an object of the present invention to overcome the drawbacks and disadvantages of current systems.

Another object of the present invention is to provide a system that weighs only the product and its container to improve measurement accuracy.

Still another object of the present invention is to provide a system to accurately measure product weight or flow rate that is less expensive than similar systems currently in use.

A still further object of the present invention is to provide a system to more accurately measure product weight or flow rate that is more reliable than similar systems currently in use.

SUMMARY OF THE INVENTION

To accomplish the foregoing objects, there is provided an improved solid particulate gravity conveyor and weighing system and methods thereof. It overcomes the drawbacks and disadvantages of current systems by having improved measurement accuracy, and is less expensive and more reliable than systems of the prior art.

The invention comprises a vessel adapted to contain an amount of product operatively associated with a weighing system, while all other components of the apparatus to be applied to a distinct fixed surface, such that only the weight of the product and the hopper are weighed. The invention thereby avoids burdening the weighing system with many of the heaviest loads of the system, such as the electromagnetic driver and platen. Without those large weights, accurate measurements of the change in the product weight or flow rate can be reliably achieved.

The present invention operates by optimizing a hopper to discharge a solid particulate product with respect to its material properties in a sufficient amount retained in a vessel, such that a "decoupling point" boundary is maintained. When an amount of the solid particulate material in a hopper is sufficiently large, material retained within the hopper descends through a "point" in the vessel at which the material that is being funneled toward the center of the vessel compresses laterally, forcefully enough that it bridges across the entire section. At that point, the material at this "decoupling point" boundary, and the weight of all the material above it, is fully supported by only the vessel.

To ensure that the decoupling point forms, a "fill decoupling point" amount of material must be present in the vessel before the system is turned on. Before a "fill decoupling point" amount is present, only a fraction of additional increments of material load upon the vessel. Beyond the fill decoupling point amount, the entire load of each increment added is fully supported by the vessel, and is accurately detected by the scales supporting the vessel. When the machine is turned on, much of the load of the unmeasured amounts that were added without being fully measured was simply supported by the platen below the vessel, and it falls out, never having applied any vertical load to the vessel.

The unsupported portion of the fill decoupling point amount exits after a very brief duration, but after it exits, some partial amount of the fill decoupling point amount that was not originally weighing on the vessel is high enough inside the vessel that it becomes supported by the vessel, as material at the decoupling point becomes loaded laterally by its inwardly-tapered descent. As a result, after the period of unsupported amount exiting at zero measured weight change, the measured weight of the vessel increases. That this weight becomes measurably apparent is in fact what indicates that a decoupling-point boundary appeared at all.

After formation of the decoupling point, the vessel discharges linearly with weight consistently and predictably, which is excellent for differentiation in order to report the flow rate of the system. Any deviation in the flow indicates that the system has become clogged or is emptying to a point that the decoupling point is breaking down.

Because some amount of the originally undetected weight did contribute to the initiation of the decoupling weight, the amount strictly necessary to retain in the vessel, in order to maintain the decoupling point is less than the fill decoupling point. That amount is what is referred to by the "discharge decoupling point" amount. It is calculable as the difference between the fill discharge decoupling point" amount and the magnitude of the sudden weight increase that was observed at the beginning of the first run.

Beyond the advantages in cost and reliability and simplicity that come with the present invention not requiring a high resolution weight monitoring system, there is the further simplicity that comes with knowing that this amount, the discharge decoupling point amount, is steady for repeated runs, very consistently an amount that does not vary, so long as material and hopper shape and size do not change. In testing of a desirable embodiment of a range of materials and vessel, despite wide ranging bulk density and decouple volumes for each material, the apparatus and method at which a decoupling point formed varied by only 1% of the weight capacity of the apparatus.

BRIEF DESCRIPTION OF THE DRAWINGS

Some of the features and advantages of the invention having been briefly described, others will appear from the detailed description which follows, when taken in connection with the accompanying drawings in which—

DETAILED DESCRIPTION OF THE PREFERRED EMBODIMENT

While the present invention will be described more fully hereinafter with reference to the accompanying drawings, in which a particular embodiment is shown, it is to be understood at the outset that a person skilled in the art may modify the invention herein described while still achieving the favorable results of this invention. Accordingly, the description which follows is to be understood as a broad teaching disclosure directed to persons of skill in the appropriate arts and not as limiting upon the present invention.

Figure 1A:
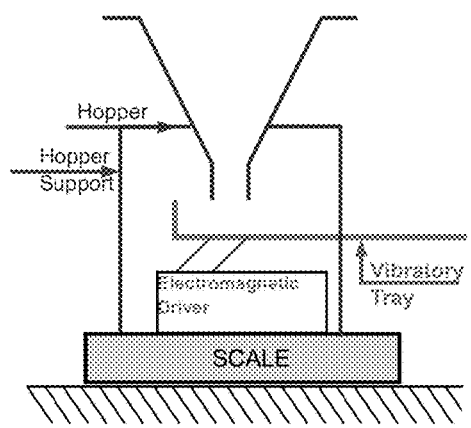
FIG. 1a illustrates schematically a prior art method of determining product weight by weighing the empty hopper, the feed mechanism and all of the supporting structure.
Figure 1B:
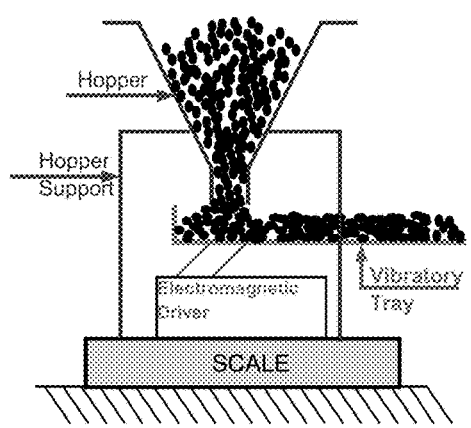
FIG. 1b illustrates schematically a prior art method of determining product weight by weighing the hopper containing product, the feed mechanism and all of the supporting structure.

Referring now to the figures and particularly to FIG. 1a, the prior art method of determining hopper, bin or silo weight is to weigh the entire mechanism, which includes the hopper, the feed mechanism and all supporting structure. The first step is to weigh the mechanism without the product as shown in FIG. 1a. The mechanism with the product is then weighed as shown in FIG. 1b; the difference being the product weight. This method is not without its inherent drawbacks and deficiencies in that often, the weight of the mechanism (hopper, feed mechanism and supporting structure) is many times the weight of the product. This requires a very high resolution in order to measure small changes in product weight which is consequently, expensive and necessarily complex. This is particularly an issue when low density products such as cat litter must be measured. Another method is to employ a level detector to measure the height of the product, but this method is also unreliable due to clumping or when especially low density product is present.

Figure 1C:
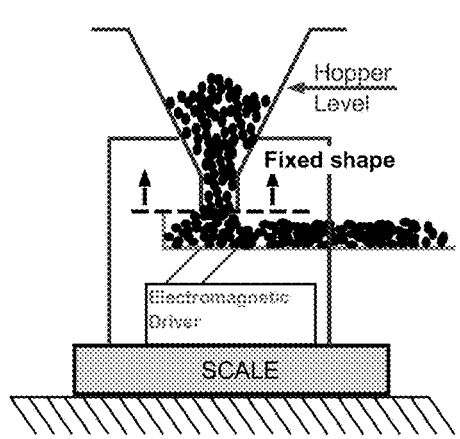
FIG. 1c illustrates schematically a prior art method of inferring hopper level by product weight by weighing the hopper containing product, the feed mechanism and all of the supporting structure.

Another method of determining hopper level or fill is to infer hopper level based on fill weight. Measurement of weight is normally considered a good method of determining hopper level since bulk density of a given material usually fairly consistent, and it "integrates" the uneven surface level of the product and does not rely on material characteristics. The main drawback of this method is that some of the material may not be in the "Fixed Shape" zone, as shown by the dotted lines in FIG. 1c. If this is the case some degree of error may be introduced by unknown or variable volume of the product not in the Fixed Shape zone. Notwithstanding the foregoing, level by weight is still considered the most accurate method of solid particle level measurement, albeit the most expensive.

Figure 1D:
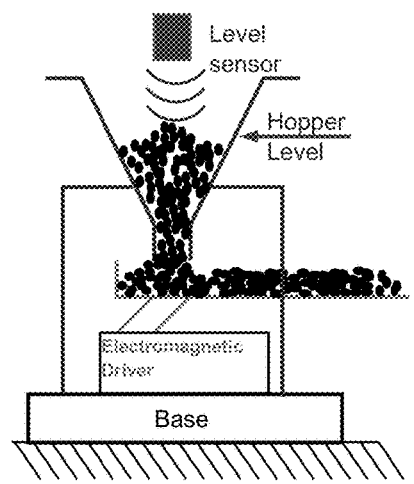
FIG. 1d illustrates schematically a prior art method of determining hopper level by direct measurement.

Hopper level may also be measured directly as shown in FIG. 1d by employing a level sensor positioned above the hopper, but this method can be unreliable due to product shape. In addition, the surface characteristics of some materials make it difficult to reliably sense the location of the surface. Note that in connection with the above methods, the vibratory conveyor is not running.

Another method of weight measurement is to measure a batch amount of product delivered to the hopper. If the time required to deliver a batch amount is known, then the flow rate can be determined. A change in weight with respect to time is the flow rate, or in other words, the first derivative of the weight with respect to time yields the flow rate. There are currently two measurement methods or techniques in general use—supported and suspended. In both cases, the entire weight of the mechanism (the hopper, vibratory tray and the electromagnetic drive) plus the weight of the product is measured.

Figure 2A:
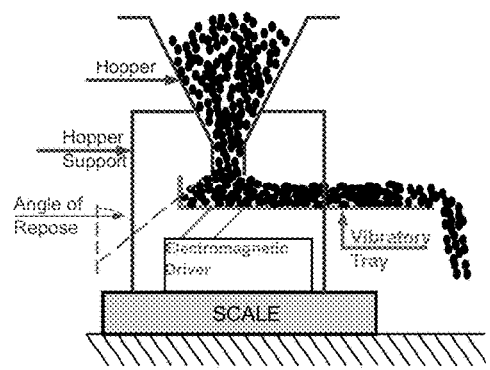
FIG. 2a illustrates schematically a prior art method of determining hopper level by weighing the hopper containing the product, the feed mechanism and all of the supporting structure by supporting the apparatus atop a scale.
Figure 2B:
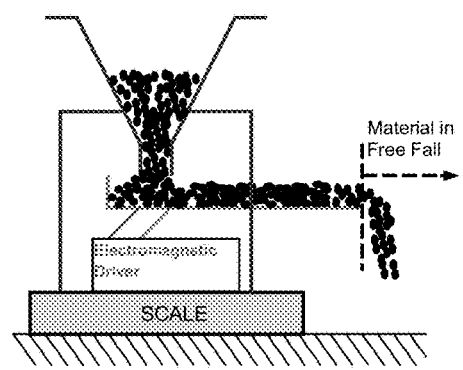
FIG. 2b illustrates schematically a prior art method of determining hopper level by weighing the hopper containing the product, the feed mechanism and all of the supporting structure by supporting the apparatus atop a scale.

The most commonly employed method for measuring small weights is shown in FIG. 2a and FIG. 2b. The flow begins with a full hopper, as shown in FIG. 2a and as product flows out of the hopper on the vibratory conveyor, the hopper level drops after a measured time period as shown in FIG. 2b. This is an inference of product level during weight measurement. However, the actual measurement is all of the material plus the equipment, except that which is in "free fall" as shown in FIG. 2b. Since product flow is the first derivative of the weight measurement, and the "loss in weight" is a vary small part of the total, very high weight resolutions must be averaged over time in order to obtain a good signal representative of the product flow rate.

Figure 2C:
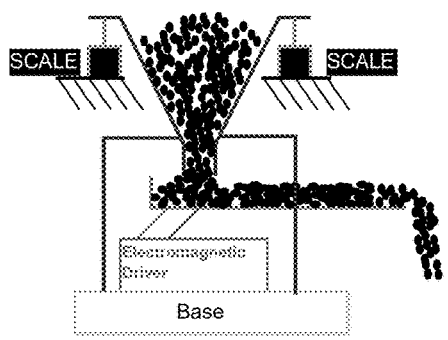
FIG. 2c illustrates schematically a prior art method of determining hopper level by weighing the hopper containing the product, the feed mechanism and all of the supporting structure by suspending the apparatus from a scale.
Figure 2D:
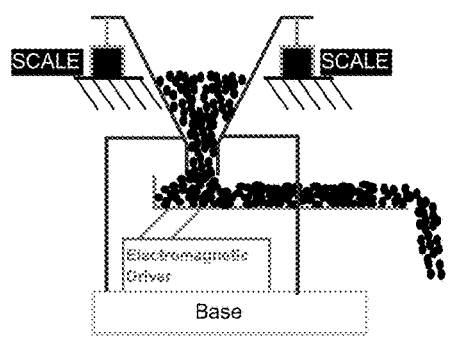
FIG. 2d illustrates schematically a prior art method of determining hopper level by weighing the hopper containing the product, the feed mechanism and all of the supporting structure by suspending the apparatus from a scale.

When the hopper is large, all of the weight is measured, including the supports and base as described in FIG. 2a and FIG. 2b. This is very little difference in the output of the two methods and as actual product weight can be a very small percentage of the total weight measurement, a very high measurement resolution is needed in order to be meaningful. FIG. 2c and FIG. 2d illustrate the use of only two scales, however, the actual minimum would be three for actual use.

As seen from the foregoing, the methods and apparatus described above generally require, in one form or another, that the entire mechanism (hopper, base, and driver) be weighed along with the material in order to measure the weight or flow rate of a product contained in the hopper. The present invention, in contrast, enables weighing only the hopper and the product, which results in a much improved and more accurate weight measurement. More specifically, the present invention hinges around a concept that, for the purposes stated herein, shall be referred to as the "decoupling point".

The decoupling point may be defined as the point at which the weight of particulate in a hopper, bin, or some other container (generally tapering) with an opening at the bottom, transfers the preponderance of the additional material's weight to the walls of the container, and not to the material below that point which is supported by a surface (e.g., a "platen") or other supporting means. Stated otherwise, there is a point at which sufficient material is added to the bin so that a "material bridge" is formed across the hopper and the weight of the material transfers from the platen below to the container itself. Also, the material is in continuous contact with itself from the top of the material until it contacts the bottom surface. There are two generally accepted methods of containing the material between the hopper discharge and the receiving container—angle of repose (shown in FIG. 2a) and some type of flexible coupling as shown in FIG. 7b, with angle of repose being the most prevalent.

Figures 3A, 3B:
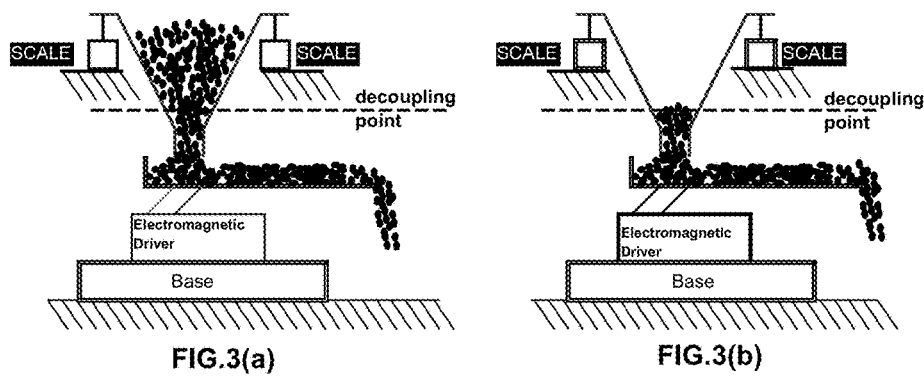
FIG. 3a illustrates schematically a method of directly weighing hopper level by product weight by weighing the hopper containing product, with all other mechanisms being supported by a distinct and unweighed supporting surface
FIG. 3b illustrates schematically a method of directly weighing hopper level by product weight by weighing the hopper containing product, with all other mechanisms being supported by a distinct and unweighed supporting surface

For most particulate matter in a shaped vessel, such as a hopper shown in FIG. 3a and FIG. 3b, there exists a point above which the weight of the material is transferred to the hopper, and below which its weight is transferred to the material below, which is supported by the base. In FIG. 3a, both the scale and the base support product weight while in FIG. 3b, only the scale supports the weight as the product below the illustrated decoupling line is supported by the base. Only product added above the decoupling point shown will be subject to being weighed. Again, the decoupling point, illustrated in the difference between FIG. 3a and FIG. 3b, is the point at which above all the material weight is transferred to the hopper or support vessel, and below which a transition starts that transfers the product weight from the hopper to the material below, as will be discussed herein below.

Figure 4A:
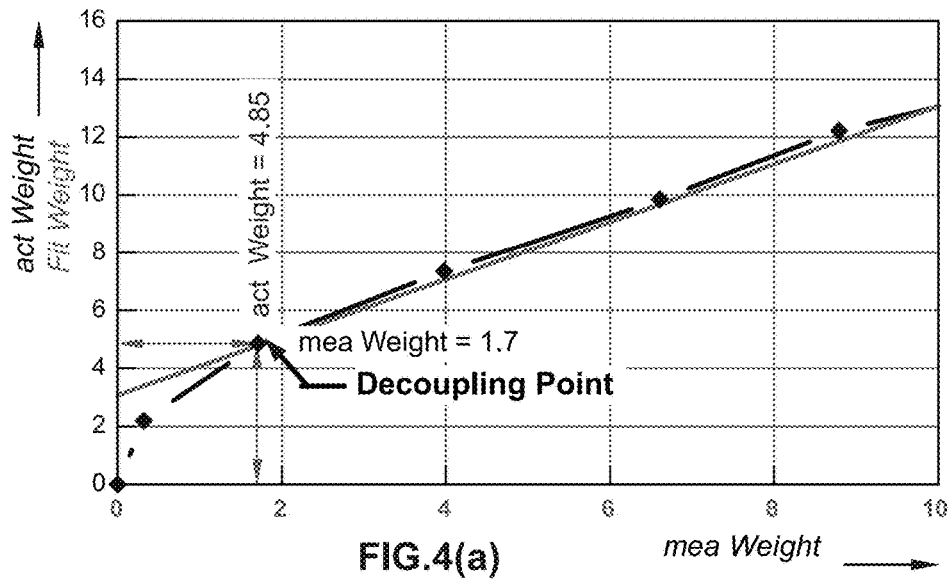
FIG. 4a illustrates an expanded view of a graph of weight data collected during filling of a dischargeable vessel.
Figure 4:
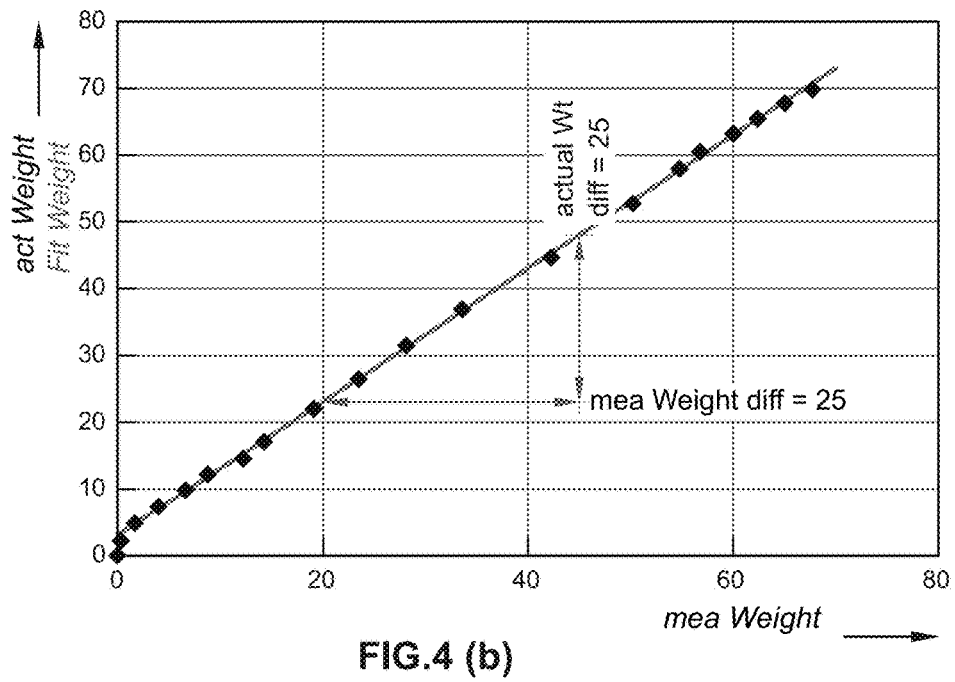
FIG. 4b illustrates a graph of weight data collected during filling of a dischargeable vessel.

The decoupling point for a particular material may be determined by measurement. FIG. 4a illustrates the point at which the decoupling point occurs. More specifically, FIG. 4a is an expanded graph of the actual weight (act Weight) of a hopper vs. the measured weight (mea Weight), as shown in FIG. 4b. In experiments that were performed, the decoupling point is shown at an actual weight of 4.85 and a measured weight of 1.7, and it is at this point where the relationship between the actual weight and the measured weight becomes linear. Referring now to FIG. 4a and FIG. 4b, the measured weight was set to zero (tare weight) with the hopper completely empty. As material was first added to the hopper, the measured weight did not indicate any weight. As more and more material is added to the hopper (see the section of FIG. 4a below the Decoupling Point), the measured weight approaches a linear relationship with the actual weight.

Once the level in the hopper reaches the decoupling point, the added weight of the material is supported by the hopper and the measured weight is the actual weight. FIG. 4b illustrates the linear relationship between the weight of the material transferred to the hopper as it is filled up from the decoupling point. Note that the relationship remains the same (linear) as the hopper is filled to the maximum level. With respect to the foregoing, note that most of the error observed between the actual weight and the measured weight is due to the method of actually measuring the material in the hopper. In experiments that were performed, the actual weight of the material in the hopper was measured using a CentriFlow® flow meter (available from Eastern Instrument Laboratories, Inc., Wilmington, N.C.) and integrating the signal to determine the weight of the material in the hopper. Since the meter is positioned at the free fall end of the vibratory feeder, the material in the feeder is weighed and any small change in the vibratory feeder level would contribute to error, however, over the entire weight of the hopper, the difference is small.

Figure 5A:
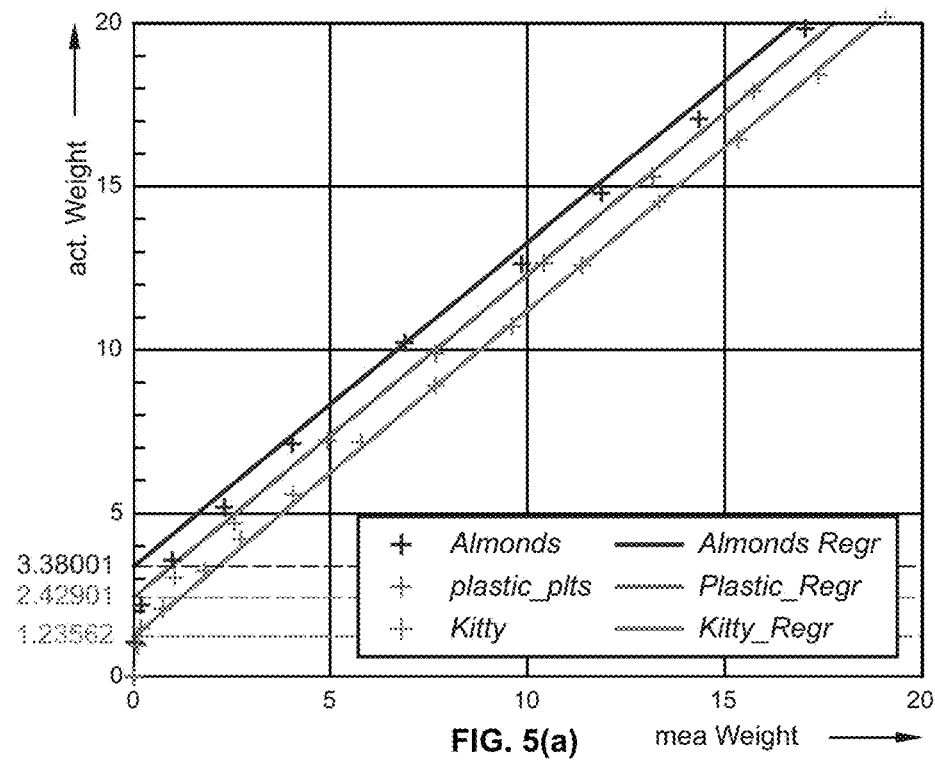
FIG. 5a illustrates an expanded view of a graph of weight data collected during fillings of a dischargeable vessel for three alternative dischargeable materials.
Figure 5B:
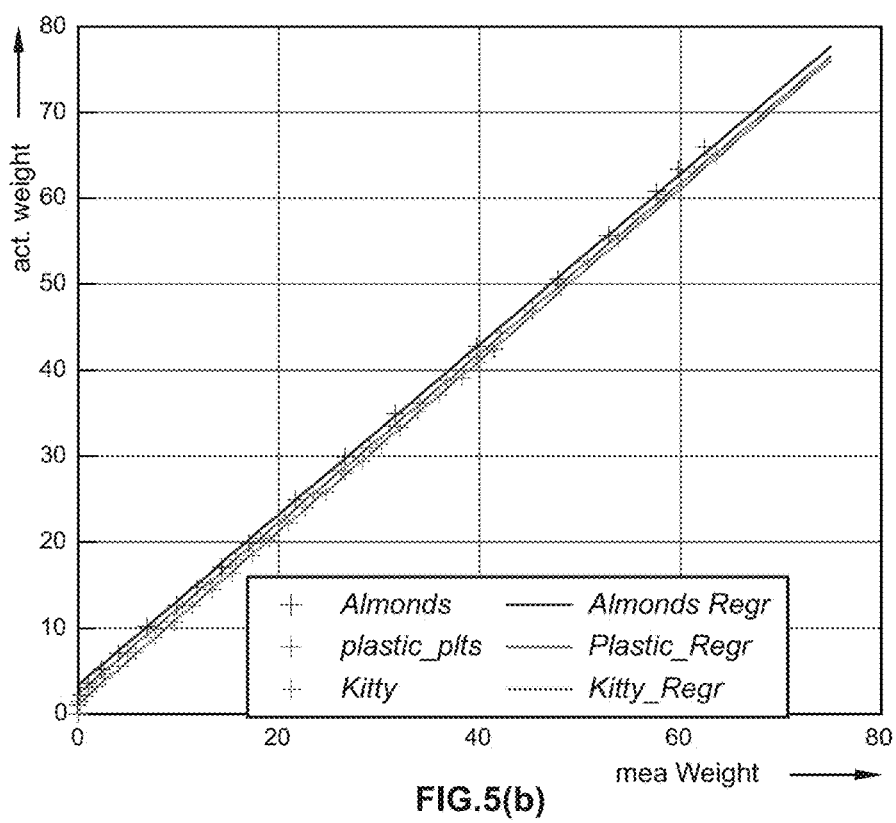
FIG. 5b illustrates a graph of weight data collected during fillings of a dischargeable vessel for three alternative dischargeable materials.

Referring now to FIGS. 5a and 5b, the fill decouple weight varies for different materials (See Table 1).

TABLE 1

| Material | bulk density lb/ft$^3$ | Decouple wt lb | Decouple vol in$^3$ | Longest side inches |
|---|---|---|---|---|
| Almonds | 37.1 | 3.38 | .0911 | 0.75" |
| Plastic pellets | 35.9 | 2.24 | .0676 | 0.15 |
| Kitty litter | 24.7 | 1.24 | .050 | .0625 |

FIG. 5a is an expanded view about the origin, with respect to FIG. 5b, to illustrate the start of the process. Table 1 illustrates three very different possible fill materials and their respective characteristics. As previously noted, the decouple weight is the weight that must be added to the measured weight to give the correct weight. It is normally determined by a best fit straight line through the data, and then the actual weight indicated at zero measured weight. Also, note that in FIGS. 4a and 4b, the decouple weight is the actual weight minus the measured weight, assuming that the measured weight is "zeroed" with the hopper completely empty. It should be noted that once the measured is "zeroed" with the hopper empty, and the offset of the decoupled weight is added, the measured weight is still not accurate until the actual weight is above the decouple point. It is preferred, in best modes, to presume that a measured weight will be accurate when the actual weight is twice (2×) the decoupled weight.

As shown in FIG. 5b, over a weight range of approximately 100 lbs, the best fit lines of all three materials (almonds, plastic pellets and kitty litter) are parallel, indicating that only the offset is affected by different materials. This means that the calibration of the scale is not affected by material selection, only the offset, which is a procedural "zero."

The decouple volume data in Table 1 is calculated from the decouple weight and bulk density. The decouple volume point is the actual physical point at which the material couples to the hopper. Comparing almonds to plastic pellets, the larger almonds require more volume to support itself on the hopper wall than the plastic pellets. Also, the size variation range is over 10:1 and the density 2:1, and the decouple weight changed approximately ±1 lb. The hopper employed for this measurement was small and can hold approximately 100 lbs, making the offset change no more than one percent (1.0%) over the product range. No decoupling point change was detected from maximum to minimum material weight for this hopper.

Figure 6A:
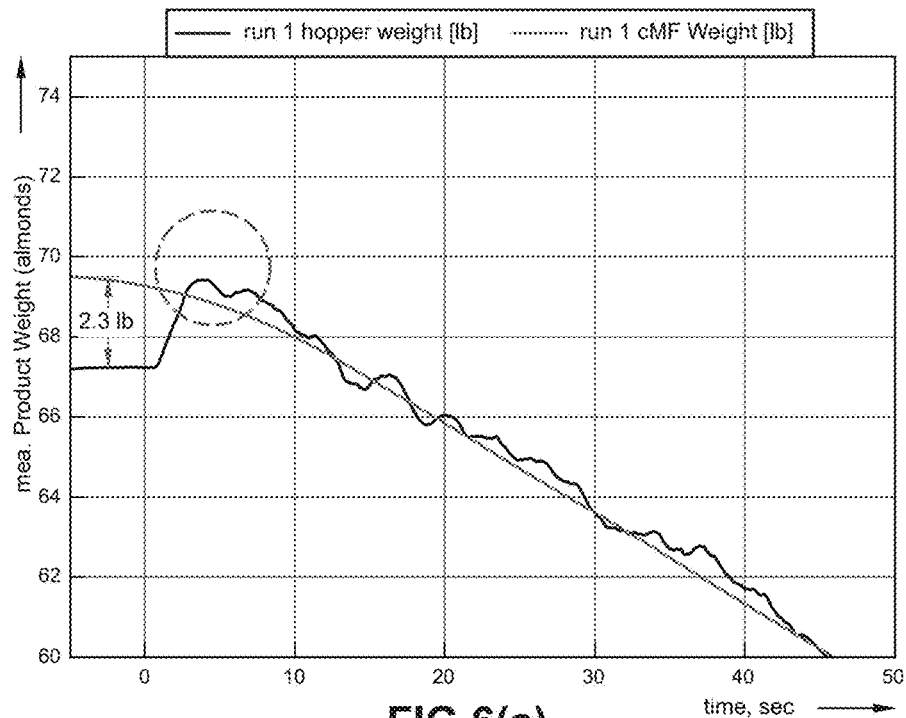
FIG. 6a illustrates an expanded view of a graph of weight data collected during the timed discharge of a dischargeable vessel.
Figure 6B:
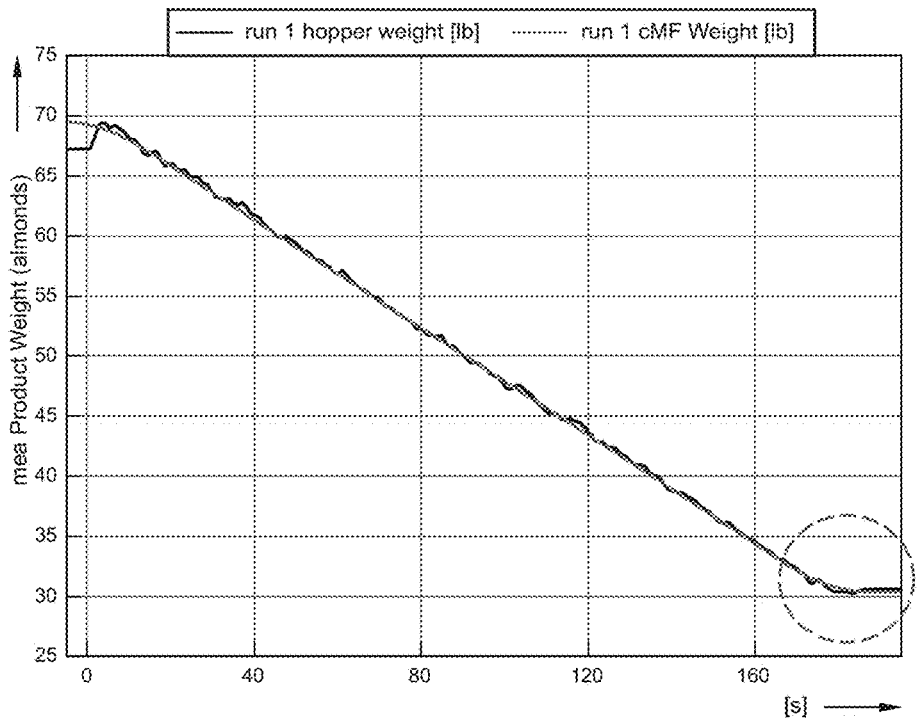
FIG. 6b illustrates a graph of weight data collected during the timed discharge of a dischargeable vessel.

Referring now to FIGS. 6a and 6b, with respect to discharge decouple weight, a reasonable assumption would be that the fill and discharge weights differ, i.e., as one fills a hopper from empty, more weight would be supported by the base, and when discharge begins, some of the fill decouple weight is transferred to the hoppers walls or the discharge decouple weight. FIG. 6a illustrates this effect. In the illustrated example, note the 2.3 lb difference between the measured hopper weight and the actual weight integrated by the CentriFlow® flow meter, which is assumed to be the actual weight. From Table 1, the fill decouple weight was 3.38 lbs, so the discharge decouple weight is 3.38−2.3=1.08 lbs.

The hopper weight measurement is "calibrated," as shown in FIG. 6a, by adding fill or discharge decouple weight to the empty run hopper weight, which yields the measured product weight. The cMF weight is the actual weight integrated by the CentriFlow® flow meter and is assumed to be the correct weight. With respect to FIG. 6a, it is important to note that the "calibrated" measured product weight joins the actual weight and also that the measured product weight rises almost immediately to the correct weight (note the dotted circle in FIG. 6a), so that it would be easy in software to find the peak if an accurate discharge batch weight were required. FIG. 6b illustrates a full run of 40 lbs of almonds that was delivered in a batch. Note that if software is employed to pick the maximum and minimum, batch weight is accurate to at least one percent, and possibly 0.25%.

It will be noted that the data presented herein was derived using a vibratory feeder, which is considered one of the most widely used short term flow variable feed devices. Furthermore, another factor contributing to flow variation by the decouple weight method is the volume of material below the decouple point, which as previously mentioned, is not weighed. Actual small flow rate changes contribute to the variation in the volume or weight below the decouple point, increasing the indicated variability. The variability introduced by the decouple unweighted volume is time dependent, so longer product runs tend to reduce measurement error.

While the disclosure discussed herein above refers to the use of the decouple system of the present invention used in conjunction with a vibratory feeder, other feeder mechanisms may be employed with equal efficacy. For example, a slide gate valve, a rotary valve and a screw feeder. Since the screw feeder is similar to the vibratory feeder, a detailed discussion thereof is not deemed necessary.

Figure 7A:
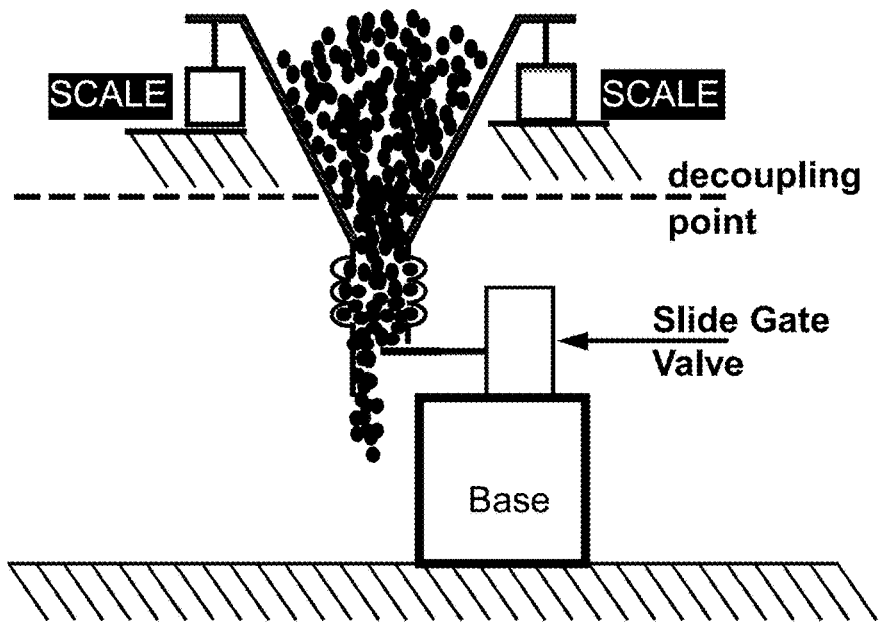
FIG. 7a illustrates an embodiment of the present invention, a gravity-conveyor decoupling point solid-particulate flow-weighing system, having a slide-gate valve and actuator
Figure 7B:
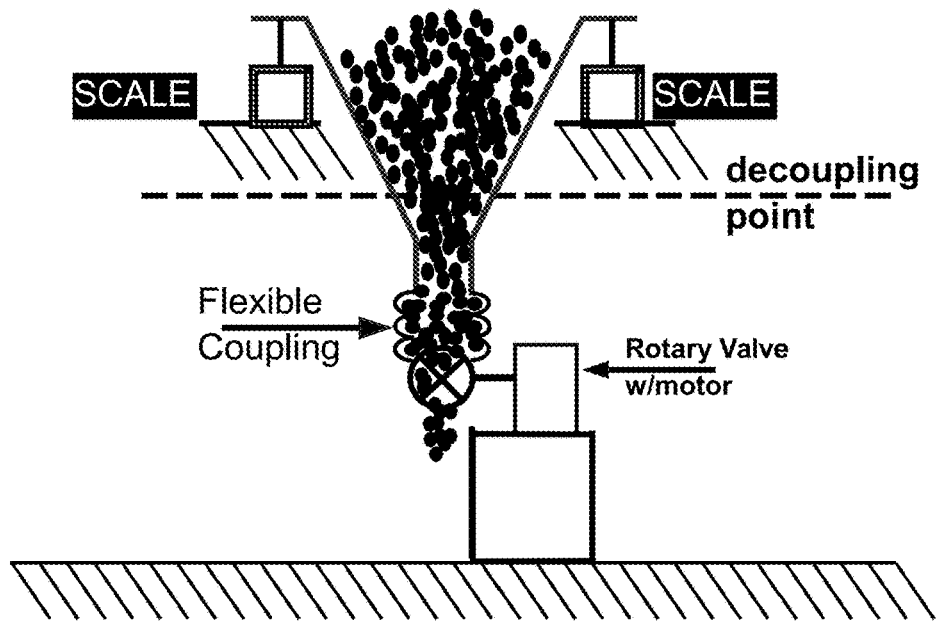
FIG. 7b illustrates an embodiment of the present invention, a gravity-conveyor decoupling point solid-particulate flow-weighing system, having a rotary valve with a motor and a flexible coupling.

FIG. 7a illustrates schematically the present system employed in combination with a slide gate valve. When a slide gate valve is used the decoupling point remains unchanged, but the volume of material supported by the base decreases significantly (as compared to the vibratory feeder of FIG. 3a). Another advantage of the slide gate feeder is that the material flow is the most constant which results in making the flow calculation smoother.

FIG. 7b illustrates schematically the present system employed in combination with a rotary valve feeder and the supported volume is small, similar to the slide gate valve discussed herein above. The rotary valve supplies a pulsating material flow, which by its nature is not as good, in terms of the flow rate measurements, as the slide gate valve. In some circumstances, the rotary valve is superior to the vibratory conveyor, if sized correctly.

The foregoing embodiments and examples are to be considered illustrative, rather than restrictive of the invention, and those modifications which come within the meaning and range of equivalence of the claims are to be included therein.

That which is claimed is:

1. A method of measurement of a solid particulate, comprising:
    a step of providing a shaped hopper, plural scales and one of several downstream mechanisms, the downstream mechanisms being selected from the group comprising vibratory feeder, slide gate valve, rotary valve and screw feeder;
    a step of filling the hopper with solid particulate in an amount that exceeds a decoupling point weight,
    a step of initiating a flow of solid particulate out of the shaped hopper such that the solid particulate is received by the selected downstream mechanism, the selected downstream mechanism being constructed and arranged to contactingly receive and convey the particulate away from the hopper, the hopper being supported upon the plural scales, and further, wherein the selected downstream mechanism is not supported by any of the plural scales and do not contribute to the weight that is applied to scales supporting the hopper;
    the step of making initial weight measurements with the plural scales upon initiating the flow of solid particulate, and tracking the measurements against time, initial weight measurements being ones which are taken from no later than the moment that particulate begins to fall relative to the hopper; and
    a step of ascertaining from tracking the initial weight measurements, the point in time at which the weight measurements reflect a rate of change in the weight of the solid particulate in the hopper that indicates the moment at which the flow of particulates generated a decoupling point in the hopper, and
    a step of ascertaining the time interval that passed between the moment of initiating the run of the flow of solid particulate and the moment of the inception of generating a decoupling point boundary, in order to integrate the initial weight measurements to identify the amount of weight which is the fill decoupling point amount of particulate in the hopper, the fill decoupling point amount being the minimum amount of solid particulate that must be supplied to the hopper before initiating a run of a flow of solid particulate to ensure that a decoupling point boundary will be generated in the hopper during a run of a flow of the solid particulate that has not yet been initiated at the time of filling of the hopper.

* * * * *